Sept. 21, 1965 P. J. RUBILOTTA ETAL 3,207,154
SNORKEL VALVE FOR ESCAPE APPARATUS
Filed Dec. 31, 1962 5 Sheets-Sheet 1

INVENTORS.
PATRICK J. RUBILOTTA
ANTHONY J. FASTAIA
BY
Max D. Farmer
ATTORNEYS

INVENTORS.
PATRICK J. RUBILOTTA
ANTHONY J. FASTAIA
BY
ATTORNEYS

INVENTORS.
PATRICK J. RUBILOTTA
ANTHONY J. FASTAIA
BY

ATTORNEYS

INVENTORS.
PATRICK J. RUBILOTTA
ANTHONY J. FASTAIA

United States Patent Office 3,207,154
Patented Sept. 21, 1965

3,207,154
SNORKEL VALVE FOR ESCAPE APPARATUS
Patrick J. Rubilotta, Staten Island, and Anthony J. Fastaia, Brooklyn, N.Y., assignors to the United States of America as represented by the Secretary of the Navy
Filed Dec. 31, 1962, Ser. No. 248,816
3 Claims. (Cl. 128—145)
(Granted under Title 35, U.S. Code (1952), sec. 266)

The invention described herein may be manufactured and used by or for the Government of the United States of America for governmental purposes without the payment of any royalties thereon or therefor.

This invention relates to valves that are particularly useful on face masks of apparatus used for escape from depths of a sea to the surface, as, for example, in the escape of personnel from submerged submarines.

In making escapes from great depths beneath the sea, as in an escape from a disabled, submerged submarine, one plan is to have the person making the escape don an air inflated, life preserver, with an attached mask or hood that encloses the wearer's head, and allow the air from the preserver to escape slowly into the mask or hood to enable such person to breathe while rising to the surface of the sea. After donning such escape apparatus and until it is possible to start the ascent, the wearer must be able to breathe through a valve controlled snorkel tube carried by the mask. Such tubes, heretofore, have projected so excessively in front of the mask as to be in danger of being snagged on submerged objects, and carried a valve that could be shut off as the wearer started, or was about to start, an ascent, and were quite complex and expensive.

An object of this invention is to provide an improved, valve controlled, snorkel tube for use on masks or hoods of escape apparatus, which will be compact and have a minimum of projection in front of the mask on which it is carried, with which the movable valve element thereof may be easily and simply operated to open or close the tube, with which the movable valve element thereof will be yieldingly but dependably held in both open and closed position and unaffected by the sea water as the wearer makes his ascent, which may be made largely of inexpensive and light-weight materials such as plastics, and which will be relatively simple, compact, and inexpensive in construction, and durable and convenient in use.

Other objects and advantages will appear from the following description of one embodiment of the invention, and the novel features will be particularly pointed out in connection with the appended claims.

Figure 11:
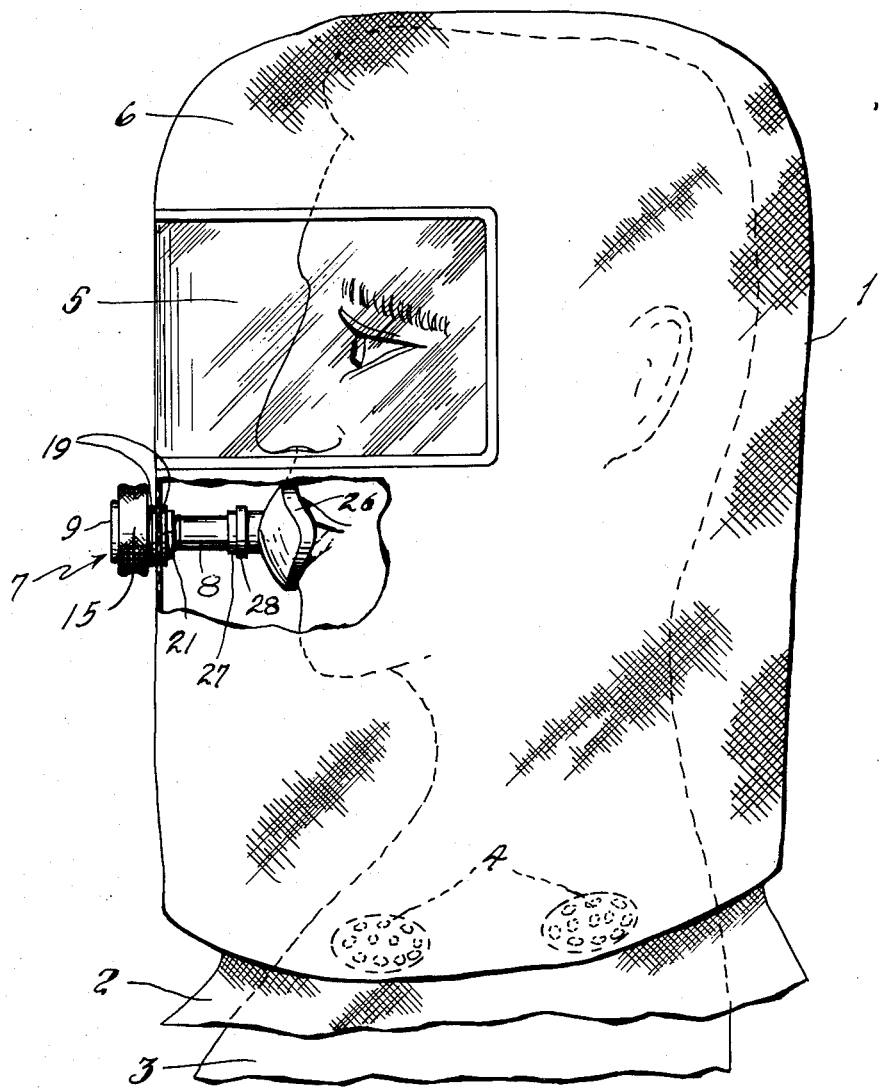
FIG. 11 is a schematic view, on a reduced scale, of a mask, with such a snorkel valve attached to the front wall thereof.

In the illustrated embodiment of the invention and referring first to FIG. 11, a hood or mask 1 is detachably connected to the upper part of a life preserver 2 that is worn by a person on his chest 3. Pressure relief valves 4 are provided between the preserver 2 and the mask or hood 1, so as to release air from the preserver slowly into the hood when the pressure in the preserver is greater than in the hood. The hood has a clear window 5 in its front wall 6 through which the wearer may observe his surroundings. Below this window, the front wall 6 has an aperture through which a snorkel valve 7 extends, and the snorkel valve is secured water-tightly to the part of the wall 6 around the aperture through which it extends.

Figure 1:
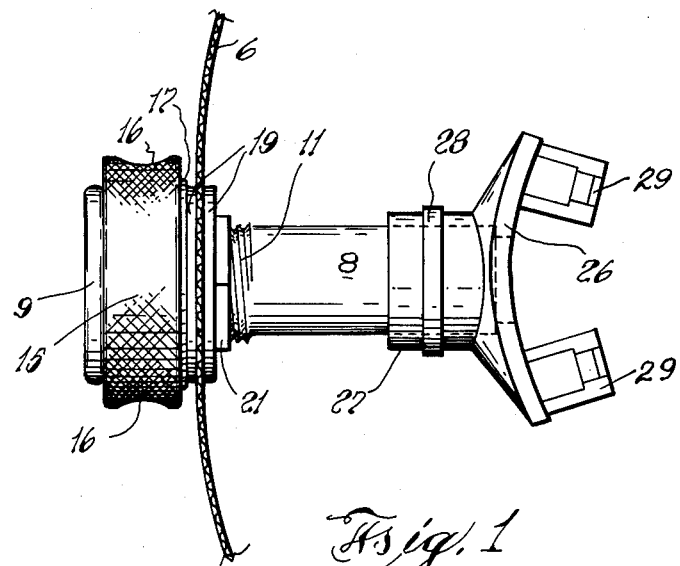
FIG. 1 is a sectional elevation of the front wall of a hood or mask of an escape apparatus, with a snorkel valve in elevation, embodying this invention attached thereto.
Figure 2:
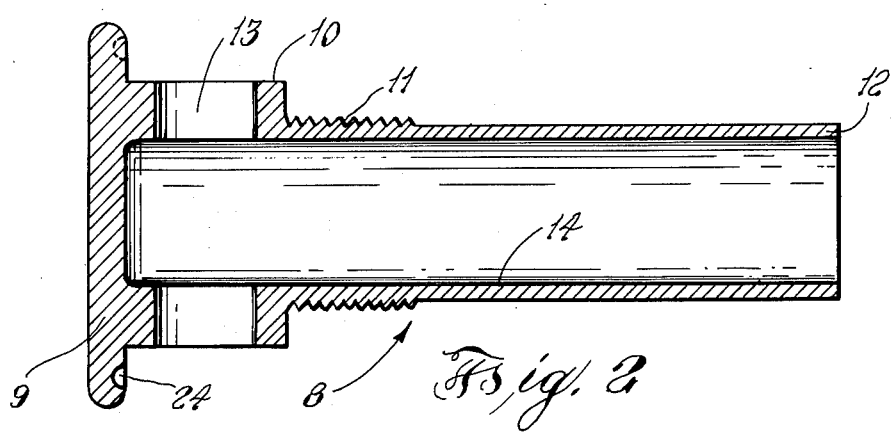
FIG. 2 is a longitudinal sectional elevation of one member of such valve.

The improved snorkel valve so attached, and shown only schematically in FIG. 11, is illustrated in side elevation and on a larger scale in FIG. 1 as secured to a part of the front wall 6 of the mask or hood through which it extends. This embodiment of the snorkel valve employs a member 8, FIG. 2, having a solid flange 9 on one end thereof, a cylindrical exterior bearing surface on a shoulder 10 thereof, adjoining and of smaller diameter than the flange. Next to the shoulder 10 is an exteriorly threaded area 11 of lesser diameter than the shoulder. The periphery of the member from the threaded area to the end 12 opposite from the flange 9 is cylindrical. A pasage 13 of member 8 extends diametrically through the shoulder 10, and another passage 14 extends from its opening into passage 13 from the passage 13 to the end 12 and is there open.

Figure 5:
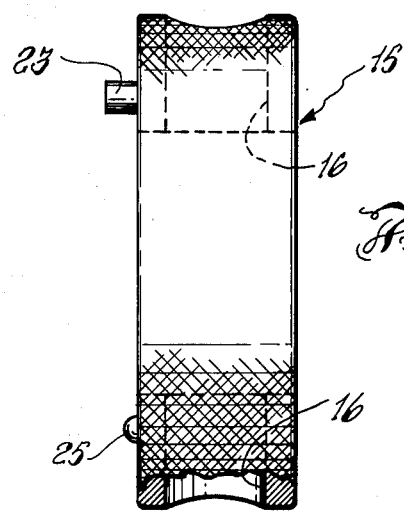
FIG. 5 is a side elevation of the sleeve part of the valve, separated from the rest of the valve.
Figure 6:
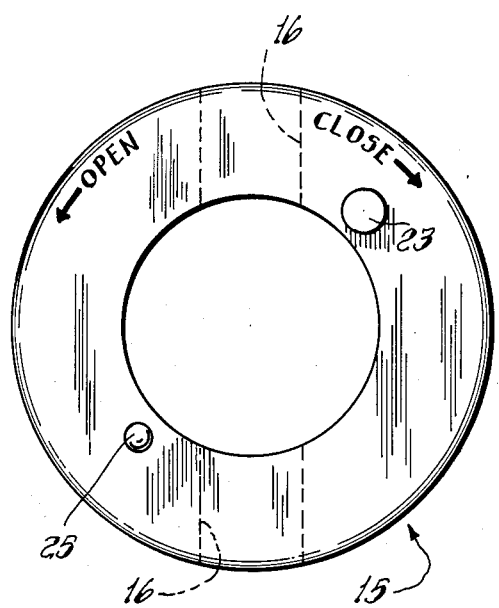
FIG. 6 is one end elevation of such sleeve.

A sleeve 15 (FIGS. 5 and 6) is rotatably mounted on the shoulder 10, with one end thereof abutting the flange 9, as shown in FIG. 1, and the axial length of this sleeve is approximately that of the axial length of the shoulder. This sleeve 15 has a passage 16 from its inner periphery or bearing surface to an exposed surface area thereof, such as diametrically thereof to opposite sides of its outer periphery. The passage 16 of the sleeve aligns and communicates with the transverse passage 13 of the shoulder when the sleeve is in one rotatable position on the shoulder, and moves out of alignment and communication with passage 13 when the sleeve is rotated through a substantial angle, such as 90°, therefrom.

Figure 7:
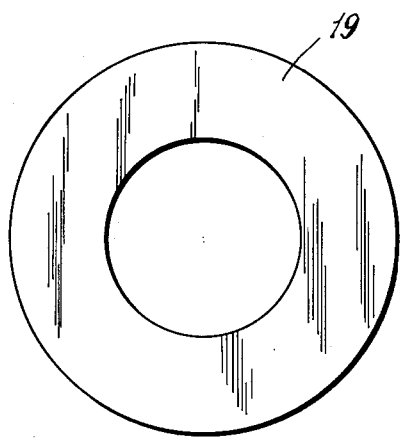
FIG. 7 is an elevation of one of two washers that are parts of the valve.
Figure 8:
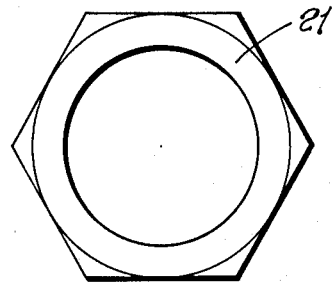
FIG. 8 is an elevation of a nut which is another part of the valve.
Figure 9:
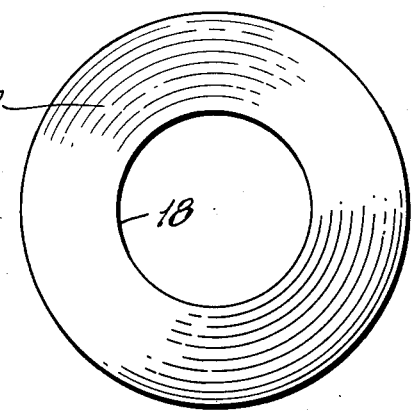
FIG. 9 is a face of the spring which is a part of the valve.
Figure 10:
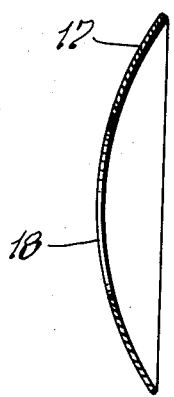
FIG. 10 is a transverse, sectional elevation of such spring.

Abutting against the side or end of the sleeve opposite from the flange 9 and disposed on the member 8 is a spring 17 which is pressed against the sleeve in a manner to be explained shortly herein. In this example, the spring is a concavo-convex disc (FIGS. 9 and 10) of spring material (metal or plastic) with an aperture 18 of a size to fit over and receive the threaded part of member 8, and abut against the end of the sleeve 15 (FIG. 1). A pair of washers 19 (FIGS. 1 and 7) with center apertures 20 are next mounted face to face on the threaded part 11 of member 8 and abut against the spring 17 as shown in FIG. 1, and a nut 21 (FIGS. 1 and 8) is then threaded on the threaded portion 11 of member 8. When this nut is tightened toward the sleeve it will clamp together the two washers and press the washers and spring toward the sleeve 15. The spring will yieldingly and resiliently press the sleeve 15 against the flange 9 on the member 8. In use, the wall 6 of the front of the face mask has an aperture through which the member 8 passes, and is disposed between the washers 19, so that when the nut is tightened while the wall 6 is between the washers, the snorkel valve will be tightly clamped to the face mask with a water-tight seal.

Figure 3:
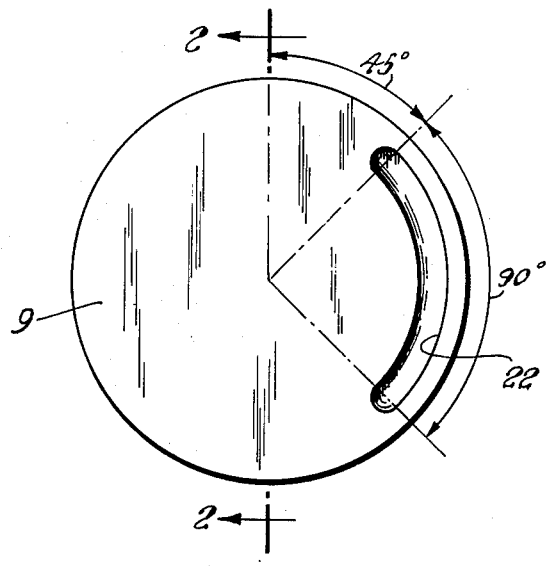
FIG. 3 is an end elevation of such member that is shown in FIG. 2.
Figure 4:
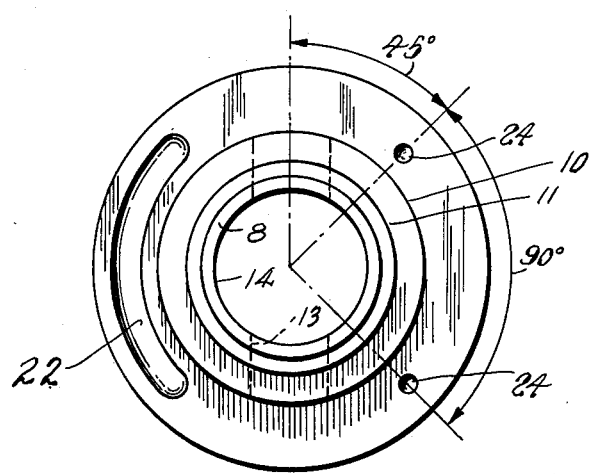
FIG. 4 is an end elevation of the opposite end of the member shown in FIG. 2.

In order for the user to know when the sleeve is in its open or closed, rotary positions on the shoulder 10 of member 8, the flange 9 on the member 8, in its margin that is radially outward from the shoulder 10, is provided with an arcuate slot 22 (FIGS. 3 and 4) from face to face of the flange, with a linear length equal to the desired fractional rotary movement of the sleeve. The center of the curve of slot 22 is at the axis of rotation of the sleeve. A pin 23 on that end face of the sleeve toward the flange 9 extends into and runs in the slot 22 which limits the rotary movement of the sleeve. The pin 23 is located on the sleeve in a position to engage with one end of the slot 22 when the passage 16 of the sleeve is aligned with the passage 13 of the shoulder, so that rotation of the sleeve from that position will carry passage 16 well out of communication with passage 13. The length of the slot may advantageously be equal to about 90° rotation of the sleeve.

In order that the sleeve may be yieldingly held in each of the positions determined by the relative movement of the slot 22 and the pin 23, the face of the flange towards the sleeve and radially outwardly from the shoulder has two angularly spaced, shallow, partly spherical cavities or recesses 24 (FIGS. 2 and 4) at the same radial distance from the axis of rotation of the sleeve. The recesses are about 90° apart angularly of such sleeve rotation. The sleeve 15, on the same end face that carries pin 23, also carries a small, partly spherical hump 25 (FIGS. 5 and 6) at the same radial distance from the axis of rotation of the sleeve as the recesses 24 in the flange 9. The hump 25 is arranged along its path of rotation with the sleeve in a position to enter one of the recesses 24 when the pin 23 is about at one end of the slot 22, and to enter the other of the recesses 24 when the pin 23 is at about the other end of the slot 22. Since the spring 17 resiliently presses the sleeve 15 towards the flange 9, the sleeve can move far enough axially along the shoulder to permit the hump 25 to snap into and be cammed out of the recesses 24 as the sleeve is angularly moved on the shoulder 10.

In use, when the snorkel valve is mounted as disclosed on the face mask of the escape device, the wearer before or after donning the mask, rotates the sleeve 15 on shoulder 10 to that limit of its movement where the passage 16 of the sleeve is aligned and communicates with the passage 13 of the member 8. This permits passage of ambient air through the sleeve and member 8 to and from the the interior of the mask and enables the wearer to breathe. Just as the wearer is ready or about to emerge and enter the sea for an ascent to the surface of the sea, he rotates sleeve 15 to the other limit of its movement which carries sleeve passage 16 out of communication and alignment with passage 13 of the member 8. This prevents entry of water from the sea through the snorkel valve into the face mask during the wearer's ascent. When the wearer completes his ascent, he rotates the sleeve 15 back into its former position to permit air to enter the mask and enable him to breathe until he can take off the mask.

Preferably a rubber mouthpiece 26 (FIG. 1) is detachably mounted on the end of member 8 within the mask, and is of a size to be gripped by the teeth of the wearer. This mouthpiece has a tubular portion 27 that fits over the open end 12 of member 8 and is detachably clamped thereon by an encircling adjustable band 28. The mouthpiece has a passage that conveys air from the open end 12 of the member 8 to the mouth of the wearer, and carries projections 29 that are received in the mouth of the wearer and are gripped by his teeth.

It will be understood that various changes in the structural details, materials and arrangements of parts, which have been herein described and illustrated in order to explain the nature of the invention, may be made by those skilled in the art, within the principle and scope of the invention as expressed in the appended claims.

What is claimed is:

1. A snorkel valve for use on sea escape masks which comprises;
   a member having
      a solid flange on one end,
      a cylindrical shoulder next on the flange and of lesser diameter than the flange,
      a threaded area of its periphery, of lesser diameter than said shoulder, between said shoulder and the end of said member opposite from said flange,
      a transverse passage approximately diametrically through said member in said shoulder, and
      another passage extending axially of said member solely from and communicating with, said transverse passage approximately to said end opposite from said flange and there open,
   a sleeve rotatably mounted on said shoulder and abutting said flange, and having a passage from its exposed exterior to its inner periphery that opens into said transverse passage upon rotation of said sleeve,
   a spring mounted on said member and pressing said sleeve against said flange,
      said sleeve and flange having interacting parts which limit angular rotation of said sleeve on said member to provide an open position in which its passage is in communication with said member passageways and a closed position in which said communication is broken,
      said sleeve and flange having interacting detent means cooperative with said spring to yieldingly index and hold said sleeve in said open and closed positions, and
      locknut means adjustable on said threaded area of said member by which said valve may be secured to a wall of said face mask through an aperture through which said member may extend,
   a pair of washers on said member and abutting said spring,
   a nut on said threaded area, adjustable thereon toward and from said shoulder, pressing said washers together and against said spring, and pressing washers and spring against said sleeve to urge said sleeve resiliently against said flange, said flange and sleeve having interengaging humps and that hold said sleeve yieldably in each of two rotary positions in one of which the sleeve passage communicates with said transverse passage and in the other of which is out of such communication, and also having interacting parts that positively limit rotary movement of said sleeve substantially beyond the movement between said two positions,
   whereby a wall of a face mask, through an aperture in which said member extends, may be clamped between said washers by adjustment of said nut.

2. The valve according to claim 1, said spring being positioned on said member between said sleeve and said mask wall to serve the dual function of biasing said sleeve against said member flange and biasing said mask wall between said spring and locknut.

3. The valve according to claim 2, said sleeve having a length less than its peripheral diameter.

References Cited by the Examiner

UNITED STATES PATENTS

| | | | |
|---|---|---|---|
| 1,319,755 | 10/19 | Cherry | 251—286 |
| 1,550,551 | 8/25 | McDowell | 137—447 |
| 2,521,490 | 9/50 | Strauss | 251—352 |
| 2,820,477 | 1/58 | Dorsak et al. | 137—625.46 |
| 2,828,050 | 3/58 | Engelder | 251—352 |
| 3,080,586 | 4/61 | Steinke | 128—142 |

RICHARD A. GAUDET, *Primary Examiner.*